(12) United States Patent
Hirose et al.

(10) Patent No.: US 10,360,518 B2
(45) Date of Patent: Jul. 23, 2019

(54) SHARED VEHICLE MANAGEMENT DEVICE

(71) Applicant: Nissan Motor Co., Ltd., Kanagawa (JP)

(72) Inventors: Satoru Hirose, Kanagawa (JP); Satoshi Chinomi, Kanagawa (JP); Yukiko Nagai, Kanagawa (JP); Masaki Kuno, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 15/126,933

(22) PCT Filed: Jan. 29, 2015

(86) PCT No.: PCT/JP2015/052519
§ 371 (c)(1),
(2) Date: Sep. 16, 2016

(87) PCT Pub. No.: WO2015/141291
PCT Pub. Date: Sep. 24, 2015

(65) Prior Publication Data
US 2017/0098176 A1 Apr. 6, 2017

(30) Foreign Application Priority Data
Mar. 19, 2014 (JP) .................. 2014-055959

(51) Int. Cl.
*G06Q 10/00* (2012.01)
*G06Q 10/02* (2012.01)
(Continued)

(52) U.S. Cl.
CPC ............. *G06Q 10/02* (2013.01); *G06Q 10/20* (2013.01); *G06Q 30/0645* (2013.01); *G06Q 50/30* (2013.01)

(58) Field of Classification Search
CPC ..... G06Q 10/02; G06Q 10/20; G06Q 30/0645; G06Q 50/30
See application file for complete search history.

(56) References Cited

U.S. PATENT DOCUMENTS 5,945,919 A * 8/1999 Trask ................ G08G 1/202
235/384
6,181,991 B1 * 1/2001 Kondo ................ B60L 53/305
701/22
(Continued)

FOREIGN PATENT DOCUMENTS

CN 102473351 A 5/2012
JP 2010-231258 A 10/2010
(Continued)

OTHER PUBLICATIONS

Kek, "A decision support system for vehicle relocation operations in carsharing systems", published by www.elsevier.com on Feb. 19, 2008, all pages (Year: 2008).*
(Continued)

*Primary Examiner* — Kevin H Flynn
*Assistant Examiner* — Omar Zeroual
(74) *Attorney, Agent, or Firm* — Osha Liang LLP

(57) ABSTRACT

A shared vehicle management device for managing shared vehicles used by users, including a rental request acquisition unit configured to acquire a rental request by the user, a vehicle state acquisition unit configured to acquire state information of the shared vehicle, a rental determination unit configured to determine a necessity level of maintenance of the shared vehicle on a basis of the state information of the shared vehicle, and determine whether to prohibit or permit a rental of the shared vehicle with the state information of the shared vehicle and the rental request by the user, and a recommended destination selection unit configured to determine that the shared vehicle needs maintenance upon a (Continued)

determination that the necessity level of maintenance of the shared vehicle is higher than a predetermined reference value when the rental determination unit determines whether to prohibit or permit the rental of the shared vehicle.

12 Claims, 7 Drawing Sheets

(51) Int. Cl.
*G06Q 30/06* (2012.01)
*G06Q 50/30* (2012.01)

(56) References Cited

U.S. PATENT DOCUMENTS

| | | | | |
|---|---|---|---|---|
| 6,317,720 | B1* | 11/2001 | Murakami | G06Q 10/02 |
| | | | | 705/7.22 |
| 6,336,295 | B1* | 1/2002 | Takei | E04H 6/42 |
| | | | | 52/174 |
| 6,850,898 | B1* | 2/2005 | Murakami | B60L 53/305 |
| | | | | 705/13 |
| 6,947,881 | B1* | 9/2005 | Murakami | B60L 53/305 |
| | | | | 703/8 |
| 2004/0054561 | A1* | 3/2004 | Ogura | G06Q 10/02 |
| | | | | 705/5 |
| 2007/0239478 | A1* | 10/2007 | Yui | G06Q 20/127 |
| | | | | 705/307 |
| 2010/0256846 | A1* | 10/2010 | Shaffer | G01C 21/3469 |
| | | | | 701/22 |
| 2010/0280700 | A1* | 11/2010 | Morgal | G06Q 10/02 |
| | | | | 701/31.4 |
| 2011/0010300 | A1 | 1/2011 | Audet | |
| 2012/0098676 | A1 | 4/2012 | Oizumi et al. | |
| 2012/0271547 | A1* | 10/2012 | Mori | B60L 53/665 |
| | | | | 701/527 |
| 2012/0296678 | A1* | 11/2012 | Boot | G06Q 10/02 |
| | | | | 705/5 |
| 2013/0179057 | A1* | 7/2013 | Fisher | B60L 53/68 |
| | | | | 701/117 |
| 2014/0089016 | A1* | 3/2014 | Smullin | G06Q 10/02 |
| | | | | 705/5 |
| 2014/0316939 | A1* | 10/2014 | Uyeki | B60L 58/21 |
| | | | | 705/26.9 |
| 2015/0345962 | A1* | 12/2015 | Graham | G01C 21/343 |
| | | | | 701/430 |
| 2016/0092976 | A1* | 3/2016 | Marusyk | G06Q 30/0645 |
| | | | | 705/307 |

FOREIGN PATENT DOCUMENTS

| | | |
|---|---|---|
| JP | 2012-215920 A | 11/2012 |
| JP | 2013-069226 A | 4/2013 |
| JP | 2014-032041 A | 2/2014 |
| JP | 2014-055959 A | 3/2014 |
| WO | 2009/059164 A2 | 5/2009 |
| WO | 2012/004898 A1 | 1/2012 |

OTHER PUBLICATIONS

International Preliminary Report on Patenability issued for corresponding International Application No. PCT/JP2015/052519, dated Sep. 22, 2016 (8 pages).

International Search Report for corresponding International Application No. PCT/JP2015/052519, dated Mar. 3, 2015 (10 pages).

* cited by examiner

FIG. 3A 311 (31)

| VEHICLE ID | VEHICLE STATE MANAGEMENT INFORMATION | | | | | | |
|---|---|---|---|---|---|---|---|
| | STATION/ PARKING LOT IDENTIFICATION INFORMATION | REMAINING AMOUNT OF ENERGY | VEHICLE CONDITION INFORMATION | OPERATION INFORMATION/ RESERVATION INFORMATION | OPERATION INFORMATION OVER TIME | RENTABILITY INFORMATION |
| V1 | U1 | E1 | M1 | RV1 | P1 | Y/N |
| V2 | U2 | E2 | M2 | RV2 | P2 | Y/N |
| V3 | U3 | E3 | M3 | RV3 | P3 | Y/N |
| V4 | U4 | E4 | M4 | RV4 | P4 | Y/N |
| V5 | U5 | E5 | M5 | RV5 | P5 | Y/N |

FIG. 3B

| FACILITY IDENTIFICATION INFORMATION | FACILITY MANAGEMENT INFORMATION 312 (31) | | | |
|---|---|---|---|---|
| | WORKSHOP IDENTIFICATION INFORMATION | POSSIBLE START TIME OF CHARGING / MAINTENANCE | ESTIMATED FINISH TIME OF CHARGING/ MAINTENANCE | OPERATION RATE |
| ST1 | ST11~ST1n | T11 | T21 | P1 |
| ST2 | ST21~ST2n | T12 | T22 | P2 |
| ST3 | ST31~ST3n | T13 | T23 | P3 |
| ST4 | ST41~ST4n | T14 | T24 | P4 |
| ST5 | ST51~ST5n | T15 | T25 | P5 |

FIG. 3C 313 (31)

| OPERATOR ID | OPERATOR MANAGEMENT INFORMATION |||| PERSONNEL MANAGEMENT INFORMATION |
| --- | --- | --- | --- | --- | --- |
| | VEHICLE TRANSPORTATION SCHEDULE | MAINTENANCE WORK SCHEDULE | CURRENT POSITION | PROGRESS INFORMATION | |
| SF1 | SQ1 | SQ11 | M1 | D1 | AQ1 |
| SF2 | SQ2 | SQ2 | M1 | D2 | AQ2 |
| SF3 | SQ3 | SQ3 | M1 | D3 | AQ3 |
| SF4 | SQ4 | SQ4 | M1 | D4 | AQ4 |
| SF5 | SQ5 | SQ5 | M1 | D5 | AQ5 |

SHARED VEHICLE MANAGEMENT DEVICE

CROSS-REFERENCE TO RELATED APPLICATIONS

This application is a national stage application of PCT/JP2015/052519, filed on Jan. 29, 2015, and claims priority to Japanese Patent Application No. 2014-055959, filed on Mar. 19, 2014, the contents of which are incorporated by reference herein in their entirety.

BACKGROUND

Technical Field

The present invention relates to a shared vehicle management device for managing shared vehicles used by users and relates also to a program used in a shared vehicle management system.

Related Art

With regard to this kind of device, a battery charging system is known which combines a charging schedule of each electric car and a vehicle operation schedule of the electric car to efficiently use electric cars in an adjusted schedule (Patent Document 1).

Patent Document 1: JP 2010-231258 A

SUMMARY

In a one-way type car sharing system, a shared vehicle rented at a station is returned to another station. When the shared vehicle after use is transported from each station to a charging facility and charged at the charging facility, and the shared vehicle after charging is reallocated to each station, the transportation of the shared vehicle needs the cost. The same is true when the shared vehicle is transported from each station to a maintenance facility.

In a conventional battery charging system, however, the cost for transporting the shared vehicle to the charging facility or maintenance facility is not taken into account. Thus, unfortunately, the operational cost of the one-way type car sharing system cannot be reduced.

One or more embodiments of the present invention reduces the cost for transporting the shared vehicle to a management facility, such as a charging facility and maintenance facility, for the shared vehicle.

One or more embodiments of the present invention determining the necessity level of maintenance of a shared vehicle on the basis of the state information of the shared vehicle; selecting a facility comprising necessary equipment for maintenance of the shared vehicle as a recommended destination when determining that the necessity level of maintenance of the shared vehicle is higher than a predetermined reference value; and presenting this recommended destination to the user.

According to one or more embodiments of the present invention, when a determination is made that the maintenance of the shared vehicle is necessary, the recommended destination, which is a facility that comprises necessary equipment for maintenance of the shared vehicle, is presented to the user thereby to encourage the user to cooperate for transportation of the shared vehicle. This operation may achieve in a reduced operation cost for transporting the shared vehicle, and the management and operation cost of the car sharing system can thus be reduced.

BRIEF DESCRIPTION OF DRAWINGS

FIG. 3A is a view illustrating an example of management information regarding the shared vehicles according to one or more embodiments of the present invention.

FIG. 3B is a view illustrating an example of management information regarding the facilities according to one or more embodiments of the present invention.

FIG. 3C is a view illustrating an example of management information regarding the schedules for operators according to one or more embodiments of the present invention.

DETAILED DESCRIPTION

Hereinafter, the shared vehicle management device according to embodiments of the present invention will be described with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention. Below, the shared vehicle management device according to one or more embodiments of the present invention will be described using an example of a device that manages and operates a car sharing system configured such that the users use shared vehicles. The car sharing system according to one or more embodiments of the present invention is a drop off-type one-way car sharing system in which the user is permitted to return the shared vehicle rented at a first station (first port) to a second station (second port).

Figure 1:
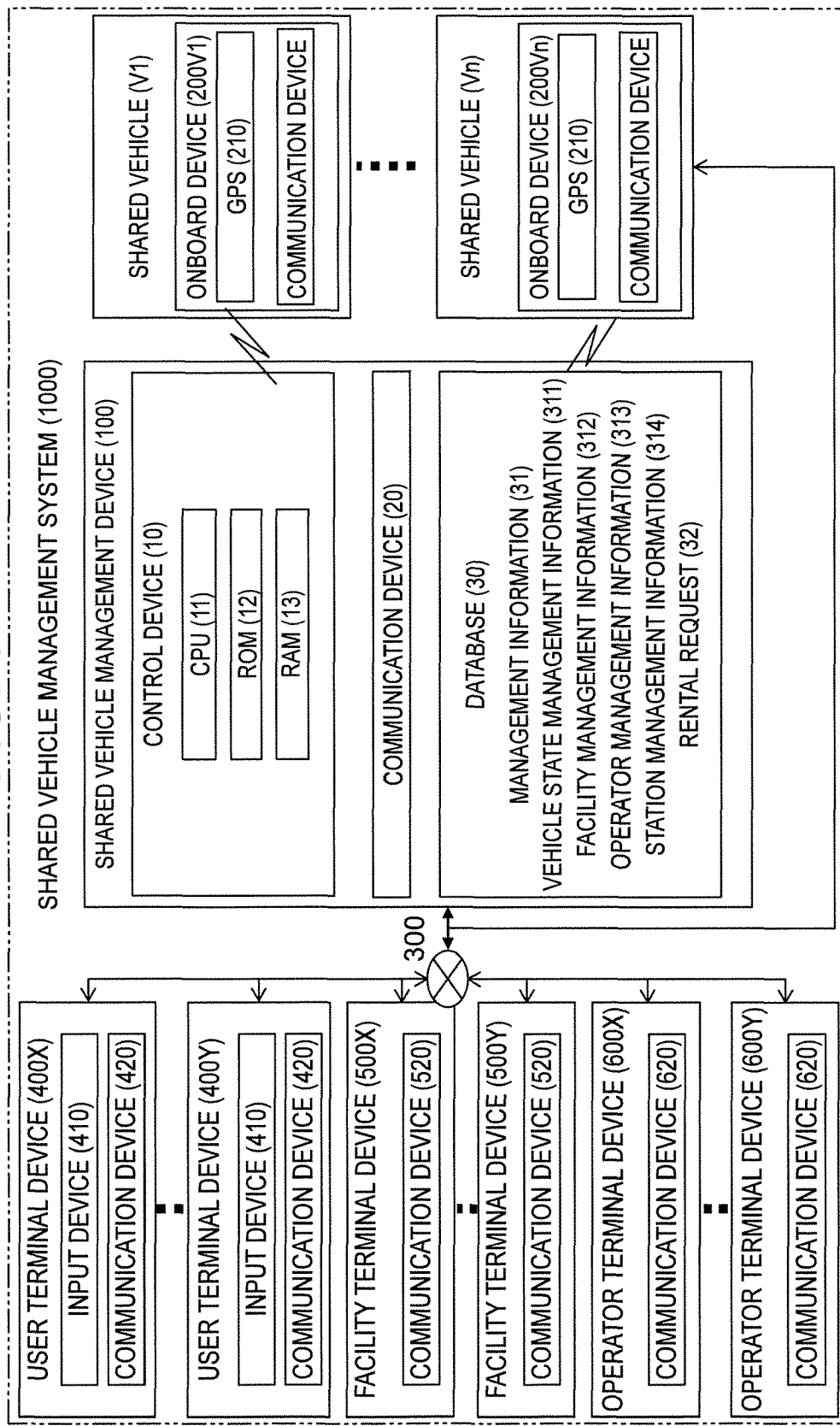
FIG. 1 is a block diagram of a shared vehicle management system comprising a shared vehicle management device according to one or more embodiments of the present invention.

FIG. 1 is a block diagram of a shared vehicle management system 1000 that manages and operates the car sharing system according to one or more embodiments of the present invention. As illustrated in FIG. 1, the shared vehicle management system 1000 according to one or more embodiments of the present invention has a shared vehicle management device 100, onboard devices 200V1 to 200Vn (which may be collectively referred to as an "onboard device 200Vn," hereinafter) carried respectively by shared vehicles V1 to Vn (which may be collectively referred to as a "shared vehicle Vn" or "shared vehicles Vn," hereinafter) used by the users, user terminal devices 400X to 400Y (which may be collectively referred to as a "user terminal device 400X," hereinafter) carried by the users, facility terminal devices 500X to 500Y (which may be collectively referred to as a "facility terminal device 500X," hereinafter) disposed at respective facilities that perform energy resupply and/or maintenance for the shared vehicles Vn (the maintenance includes check and repair, here and hereinafter), and operator terminal devices 600X to 600Y (which may be collectively referred to as an "operator terminal device 600X," hereinafter) carried by operators who perform operation as for transportation of the shared vehicles Vn in the car sharing system. Although not illustrated, the shared vehicle management system 1000 according to one or more embodiments of the present invention may include station terminal devices 700X to 700Y provided at respective stations PR to which the shared vehicles Vn are allocated. The numbers of the onboard devices 200V1 to 200Vn, user terminal devices 400X to 400Y, facility terminal devices 500X to 500Y, operator terminal devices 600X to 600Y, and station terminal devices 700X to 700Y, which constitute the shared vehicle management system 1000 according to one or more embodiments of the present invention, are not limited.

The shared vehicle management device 100, onboard devices 200V1 to 200Vn, user terminal devices 400X to 400Y, facility terminal devices 500X to 500Y, and operator terminal devices 600X to 600Y include respective communication devices (20, 220, 420, 520, and 620) and can exchange information with one another, such as via the Internet 300. The communication path may be wired or wireless. The shared vehicle management device 100 can communicate with the onboard devices 200V1 to 200Vn, user terminal devices 400X to 400Y, and operator terminal devices 600X to 600Y via the facility terminal devices 500X to 500Y and station terminal devices 700X to 700Y.

The user terminal device 400X according to one or more embodiments of the present invention is a computer comprising: a ROM (Read Only Memory) that stores programs applied to the user terminal device 400X according to one or more embodiments of the present invention; a CPU (Central Processing Unit) as an operation circuit that executes the programs (steps) stored in the ROM to perform each function; and a RAM (Random Access Memory) that functions as an accessible storage device. The user terminal device 400X according to one or more embodiments of the present invention may be a personal computer, smartphone, PDA (Personal Digital Assistant), or other handheld terminal device. The user terminal device 400X according to one or more embodiments of the present invention includes a communication device 420 that performs communication with external devices such as the shared vehicle management device 100. The programs according to one or more embodiments of the present invention are stored in a recording medium that is readable by the computer of the user terminal device 400X.

The operator terminal device 600X according to one or more embodiments of the present invention is a computer comprising: a ROM (Read Only Memory) that stores programs applied to the operator terminal device 600X according to one or more embodiments of the present invention; a CPU (Central Processing Unit) as an operation circuit that executes the programs stored in the ROM to perform each function (step); and a RAM (Random Access Memory) that functions as an accessible storage device. The operator terminal device 600X according to one or more embodiments of the present invention may be a personal computer, smartphone, PDA (Personal Digital Assistant), or other handheld terminal device. The operator terminal device 600X according to one or more embodiments of the present invention includes a communication device 620 that performs communication with external devices such as the shared vehicle management device 100. The programs according to one or more embodiments of the present invention are stored in a recording medium that is readable by the computer of the operator terminal device 600X.

Each of the onboard devices 200V1 to 200Vn according to one or more embodiments of the present invention includes a GPS (Global Positioning System) receiver 210 to detect the current position of each shared vehicle Vn and transmits the position of the vehicle via a communication device 220.

The shared vehicle management device 100 according to one or more embodiments of the present invention accepts a rental of a shared vehicle Vn available from one station PR to a user on the basis of a rental request that is input via the user terminal device 400X, and also accepts a return of the shared vehicle Vn from the user at another station PR.

The shared vehicles Vn used in one or more embodiments of the present invention may be electric vehicles (EVs) that are driven by electricity stored in batteries. The shared vehicles Vn are not limited to electric vehicles and may be hybrid vehicles that utilize electricity or other vehicles, such as gasoline-fueled vehicles, fuel-cell vehicles, alcohol-fueled vehicles, and hydrogen-fueled vehicles.

Figure 2:
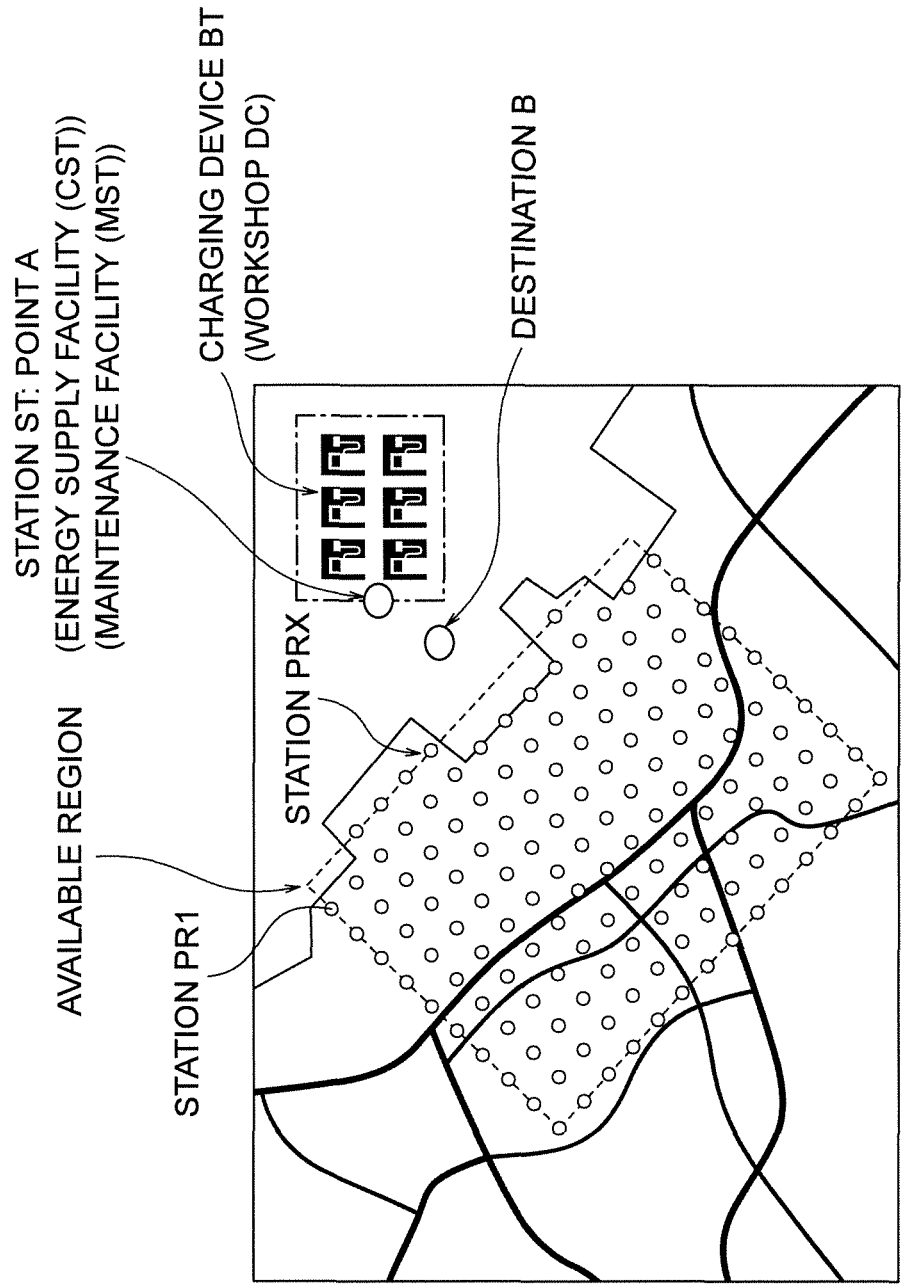
FIG. 2 is a view illustrating stations and facilities for shared vehicles to which the shared vehicle management system according to one or more embodiments of the present invention is applied.

FIG. 2 is a view illustrating stations PR (also expressed as stations) to which the shared vehicles Vn of the car sharing system used with the shared vehicle management device 100 are allocated according to one or more embodiments of the present invention. The stations PR are provided at points within a predetermined region for use (region represented by broken lines in the figure) on a map. In FIG. 2, the stations PR are represented by circles. In the car sharing system according to one or more embodiments of the present invention, an example is illustrated in which each station PR is provided at the intersection of two orthogonal lines on the map, but the arrangement of the stations PR is not particularly limited. In the example illustrated in FIG. 2, the stations PR are arranged such that the distance between two adjacent stations PR is equal, but the arrangement of the stations PR is not limited to this. The car sharing system according to one or more embodiments of the present invention does not obligate the user to return the shared vehicle Vn to the location at which the shared vehicle Vn is rented, and is a drop off-type car sharing system which permits the user to return the shared vehicle Vn to a different location than the location at which the shared vehicle Vn is rented. The user can rent a shared vehicle Vn at a station for a rental PRL and return the shared vehicle Vn at a different desired station for return PRW.

In the car sharing system according to one or more embodiments of the present invention, the charging (energy supply) for the shared vehicles Vn allocated to the stations PR is collectively performed at an energy supply facility CST such as a collective charging station. The energy supply facility CST is provided with a plurality of charging devices BT each of which includes a workshop DC having a space for charging the shared vehicle Vn. The shared vehicle Vn after being charged is allocated again to each station PR. In the car sharing system according to one or more embodiments of the present invention, each state of the shared vehicles Vn allocated to the stations PR is collectively restored to an appropriate state at a maintenance facility MST such as a collective maintenance station. The maintenance facility MST is a facility for performing maintenance operations including check and repair for the shared vehicles Vn. The maintenance facility MST includes a plurality of workshops DC each of which has a maintenance device MM and a space for performing maintenance processes such as check and repair for the shared vehicles Vn. The shared vehicle Vn after being restored to an appropriate state is allocated again to each station PR.

In the car sharing system according to one or more embodiments of the present invention, an operator as an employee is responsible for transporting a shared vehicle Vn which needs energy supply and/or maintenance from each station PR to a facility such as the energy supply facility CST and maintenance facility MST. Similarly, the operator is responsible for transporting the shared vehicle Vn for which the energy supply and maintenance are completed from a facility such as the energy supply facility CST and maintenance facility MST to each station PR. The cost in association with the work of the operator is accounted for as the operational cost of the car sharing system.

Referring again to FIG. 1, the shared vehicle management device 100 according to one or more embodiments of the present invention comprises: a control device 10 that executes a control process for managing and operating the car sharing system; a communication device 20; and a database 30. The shared vehicle management device 100 functions as a server of the shared vehicle management system 1000.

The database 30 according to one or more embodiments of the present invention stores management information 31 and a rental request 32 received from the user. The management information 31 includes vehicle state management information 311, facility management information 312, operator management information 313, and station management information 314.

The vehicle state management information 311 includes state information of the shared vehicles Vn, operation information of the shared vehicles Vn, and other information regarding the shared vehicles Vn. FIG. 3A illustrates an example of the vehicle state management information 311. As illustrated in the figure, the vehicle state management information 311 includes specific information (vehicle ID) of each shared vehicle Vn, identification information that identifies the station and parking area in the station at which the shared vehicle Vn is located (or to be located), information that represents the remaining amount of energy of the shared vehicle Vn and the condition of the shared vehicle Vn, operation information and/or reservation information of the shared vehicle Vn, information that represents change in the operation state over time, and information that represents whether or not the shared vehicle Vn can be rented.

The facility management information 312 includes operation state and other information of the facilities such as the energy supply facility CST and maintenance facility MST. The facility management information 312 is information that is acquired by the management server of the energy supply facility CST such as a charging station and the management server of the maintenance facility MST such as a maintenance station and manages the state of each facility in an integrated manner. FIG. 3B illustrates an example of the facility management information 312. As illustrated in the figure, the facility management information 312 includes information that identifies the facility and information that specifies the workshop DC (an area at which energy supply or maintenance is performed) which belongs to the facility. The facility management information 312 may be organized for each facility or organized for each workshop DC. According to the facility management information 312, when the shared vehicle Vn enters each facility or each workshop DC and when the shared vehicle Vn leaves there can be made clear. The facility management information 312 includes the operation state of each device which is acquired from the energy supply device (charger) of the energy supply facility CST such as a charging station. For example, the facility management information 312 includes availability of each energy supply device (charger), the amount of energy of the shared vehicle Vn being supplied with energy (being charged), and an estimated time when the energy supply (charging) is completed. Each facility terminal device 500X estimates the time when the energy supply (charging) is completed, on the basis of the state of the shared vehicle Vn to be supplied with energy. Each facility terminal device 500X calculates the time required for power feeding from the chargeable electric energy which is obtained on the basis of the degradation level of the battery of the shared vehicle Vn, the number of times of charging the battery, etc. The same is true for the maintenance facility. The facility terminal device 500X of the energy supply facility CST provides the operation state of the facility such as the energy supply facility CST and maintenance facility MST to the shared vehicle management device 100.

The operator management information 313 is information that represents the status of each operator who transports the shared vehicle Vn to perform charging, maintenance, etc. The operator management information 313 includes information regarding the operator, such as a schedule for the operator. The operator management information 313 is information for managing, in an integrated manner, the status of each operator such as the current position, contents of the work, movement time, working hours, and break time of the operator who performs transportation of the shared vehicle Vn in the car sharing system. FIG. 3C illustrates an example of the operator management information 313. As illustrated in the figure, the operator management information 313 includes: information that specifies each operator; a schedule of transportation of vehicle by the operator; a schedule of the maintenance work; the current position of the operator; progress information for the schedule for the operator; and personnel management information of the operator. The progress information is information that is transmitted from the operator terminal device 600X carried by each operator and reports the progress of each work. For example, the progress information associates the states of starting transportation, ending transportation, being in transportation, being in the charging work, being in cleaning up, being on a break, etc. with the time of each state.

The control device 10 according to one or more embodiments of the present invention comprises: a ROM (Read Only Memory) 12 that stores programs for executing a process of managing and operating the car sharing system; a CPU (Central Processing Unit) 11 as an operation circuit that executes the programs (steps) stored in the ROM 12 to function as the shared vehicle management device 100; and a RAM (Random Access Memory) 13 that functions as an accessible storage device.

The control device 10 of the shared vehicle management device 100 according to one or more embodiments of the present invention realizes (executes) a rental request acquisition function (rental request acquisition step), a vehicle state acquisition function (vehicle state acquisition step), a rental determination function (rental determination step), a recommended destination selection function (recommended destination selection step), and a recommended destination presentation function (recommended destination presentation step). Further, the control device 10 according to one or more embodiments of the present invention realizes a transporting work management function (transporting work management step). The shared vehicle management device 100 according to one or more embodiments of the present invention is a computer that realizes each function (step)/ executes each step by cooperation of software for achieving the above functions (steps) and the above-described hardware.

Each function (step) realized by the control device 10 of the shared vehicle management device 100 will be described below.

First, the vehicle state acquisition function/vehicle state acquisition step executed by the control device 10 according to one or more embodiments of the present invention will be described. The control device 10 of the shared vehicle management device 100 according to one or more embodiments of the present invention acquires the state information of each shared vehicle Vn. The state information of the shared vehicle Vn according to one or more embodiments of the present invention includes the remaining amount of energy that drives the shared vehicle Vn. The remaining amount of energy in one or more embodiments of the present invention is the remaining amount in the power source which is installed on the shared vehicle Vn and drives the shared vehicle Vn, such as the remaining charge of battery, the remaining amount of gasoline, the remaining charge of fuel cells, the remaining amount of hydrogen gas, and the remaining amount of alcohol fuel. The control device 10 acquires the remaining amount of energy, which is detected by an energy amount sensor provided in the onboard device 200Vn of the shared vehicle Vn, via the communication device 20. In addition, the control device 10 may acquire information, such as used hours of the battery, the number of times of charging, the number of times of rapid charging, temperature, and presence or absence of the use of air conditioner, as an index for evaluating the current capacity of battery and the cruising range from the onboard device 200Vn of the shared vehicle Vn.

The state information of each shared vehicle Vn according to one or more embodiments of the present invention includes condition information of the shared vehicle Vn. The condition information of the shared vehicle Vn in one or more embodiments of the present invention includes information as to whether or not the shared vehicle Vn needs maintenance. The condition information of the shared vehicle Vn includes the self-diagnosis result of abnormality of the shared vehicle Vn and the self-diagnosis result of the time for maintenance. When an abnormality determination device of the shared vehicle Vn determines that the vehicle is in a state that is not normal (in an abnormal state), this fact is output as the state information. The control device 10 acquires the output of the abnormality determination device provided in the onboard device 200Vn of the shared vehicle Vn, the output of a timer that self-diagnoses the time for check, and the output of a driving mileage calculation device that self-diagnoses the time for check via the communication device 20.

The control device 10 according to one or more embodiments of the present invention stores the acquired state information of the shared vehicle Vn in the database 30 as the vehicle state management information 311 which is a part of the management information 31. Although not particularly limited, the control device 10 stores the identification information of the station/parking lot to which each shared vehicle Vn is allocated, the remaining amount of energy such as the remaining charge of battery of the shared vehicle Vn, the condition information of the shared vehicle Vn, and the operation information/reservation information of the shared vehicle Vn so that they are associated with the vehicle ID (ID is the identification information, here and hereinafter), as illustrated in FIG. 3A.

In the vehicle state management information 311, the identification information of the shared vehicle Vn to which the station PR of allocation is attached is stored so as to be associated with the operation rate over time at the station PR. The operation rate of the shared vehicle Vn at each station PR varies because the movement of the user who uses the shared vehicle Vn varies over time. In addition, the operation rate of the shared vehicle Vn varies in accordance with the positional relationship between stations PR. From the variation information of the operation rate over time at each station PR, it is possible to estimate when the operation rate of the shared vehicle Vn at each station PR is high and when the operation rate is low. The control device 10 refers to this operation rate information to allow efficient allocation of the shared vehicle Vn to each station PR.

The vehicle state management information 311 of the management information 31 also includes availability of rending information that represents whether the shared vehicle Vn is in a rentable state or is not in a rentable state. This availability of rending information is a record of determination to permit a rental, determination to prohibit a rental, and determination to cancel prohibition of a rental which are determined by the rental determination function (in the rental determination step) to be described later.

Next, the rental request acquisition function (rental request acquisition step) executed by the control device 10 according to one or more embodiments of the present invention will be described. The user activates the communication device 420 of the user terminal device 400X to access the shared vehicle management device 100 and search for the shared vehicle Vn which can be reserved, and transmits a rental request 32 to rent the shared vehicle Vn. On the other hand, the control device 10 according to one or more embodiments of the present invention acquires, from the user via the user terminal device 400X, the rental request that the user desires use of the shared vehicle Vn. The rental request 32 may be a request for an immediate use by which the user can start to use the shared vehicle Vn immediately after the request or a request for a reservation of use by which the user can start to use the shared vehicle Vn from the time and date the user specifies. The control device 10 according to one or more embodiments of the present invention stores the contents of the acquired the rental request in the database 30.

The rental request according to one or more embodiments of the present invention includes "rental information" that requests use of the shared vehicle Vn. The "rental request" may include "return information" that includes the specific information of a desired station for return PRW to which the user desires to return the shared vehicle Vn. The rental request according to one or more embodiments of the present invention includes a user ID that specifies the user, a station for rental PRL from which the shared vehicle Vn is rented, and identification information of the shared vehicle Vn. The specific information of the shared vehicle Vn may be a parking space ID that specifies a parking space, in which the shared vehicle Vn to be rented is present, among a plurality of parking spaces provided in the station for rental PRL. The rental request may include a time when the shared vehicle Vn is rented, i.e. a time when starting the use. The rental request according to one or more embodiments of the present invention may or may not include a return time when the shared vehicle Vn is planned to be returned. When the planned returned time is not set in the rental request which is acquired at the time of requesting the use, the user can return the shared vehicle Vn at arbitrary timing, which is determined by the user, after the user uses the shared vehicle Vn.

Next, the rental determination function (rental determination step) executed by the control device 10 according to one or more embodiments of the present invention will be described. The control device 10 according to one or more embodiments of the present invention determines the necessity level of maintenance of the shared vehicle Vn using the state information of the shared vehicle Vn and performs a process to determine whether to prohibit or permit the rental. In the present description, the "prohibition of rental" means temporarily prohibiting the rental of the shared vehicle and does not mean absolutely prohibiting the rental. Even when the prohibition of the rental is determined, the rental condition of normal times which is preliminarily set is not changed.

When a determination is made that the necessity level of maintenance of the shared vehicle Vn is higher than a predetermined reference value, the control device 10 determines that the maintenance treatment for the shared vehicle Vn is necessary. When a determination is made that the necessity level of maintenance of the shared vehicle Vn is higher than the predetermined reference value, the shared vehicle Vn has to be transported into a maintenance facility that includes maintenance equipment for performing the maintenance treatment. The control device 10 determines a shared vehicle Vn of which the remaining charge of battery is insufficient or a shared vehicle Vn which needs maintenance such as repair and periodical check, using the state information of each shared vehicle Vn.

The control device 10 specifies the shared vehicle Vn determined that its remaining charge of battery is insufficient, as an object to be transported to a charging facility. The control device 10 specifies the shared vehicle Vn which needs maintenance such as periodical check and repair, as an object to be transported to a maintenance facility. The control device 10 according to one or more embodiments of the present invention also determines the necessity level of maintenance of a rented, shared vehicle Vn and a reserved, shared vehicle Vn and executes a process to determine prohibition or permission of a rental of the shared vehicle Vn. The control device 10 according to one or more embodiments of the present invention prohibits a rental of the shared vehicle Vn when the necessity level of maintenance is higher than the predetermined reference value, and permits a rental of the shared vehicle Vn when the necessity level of maintenance is not higher than the predetermined reference value. In addition, even when the rental is temporarily prohibited, the rental of the shared vehicle is permitted under an additional condition.

When a determination is made that the necessity level of maintenance of the shared vehicle Vn, which is determined using the state information of the shared vehicle Vn, is higher than the predetermined reference value, the control device 10 according to one or more embodiments of the present invention determines that it is not appropriate to allow the use of the shared vehicle Vn without any treatment and performs a process to transport the shared vehicle Vn to a maintenance facility. Specifically, when the remaining amount of energy of the shared vehicle Vn is less than a predetermined remaining amount threshold, the control device 10 determines that the necessity level of maintenance of the shared vehicle Vn is higher than the predetermined reference value, and performs transportation of the shared vehicle Vn to an energy supply facility. When the condition information of the shared vehicle Vn is not within (is outside) a predetermined appropriate range that is preliminarily defined, the control device 10 determines that the necessity level of maintenance of the shared vehicle Vn is higher than the predetermined reference value, and performs transportation of the shared vehicle Vn to a maintenance facility.

The control device 10 may estimate the state information at the time of returning the shared vehicle Vn on the basis of the state information at the time of renting the shared vehicle Vn and determine the necessity level of maintenance using the estimated state information at the time of return. This is because, if, after the shared vehicle Vn is rented to a user A at a station for rental PRL, the state information is lower than the predetermined reference value when the shared vehicle Vn is returned to a station for return PRW, the shared vehicle Vn may not be suitable for rental to another user B.

Specifically, the control device 10 estimates the remaining amount of energy at the time of returning the shared vehicle Vn on the basis of the remaining amount of energy at the time of renting the shared vehicle Vn. The remaining amount of energy at the time of return is obtained by subtracting an estimated amount of energy consumption from the remaining amount of energy at the time of rental. The estimated amount of energy consumption is an amount of energy that is consumed by the shared vehicle Vn from the rental point to the return point. The amount of consumed energy can be estimated on the basis of the distance of a path from the rental point to the return point and the energy consumption cost of the shared vehicle Vn. The process to estimate the amount of energy may take into account the slope of the path from the rental point to the return point, the number of intersections (the number of times of stop/start), and/or the speed. The process to estimate the amount of energy may further take into account the outside air temperature, the use of electric components such as air conditioner, and/or the attribute of a road (average speed). Any method of calculating the amount of energy consumption of a vehicle known at the time of filing of the present application can be appropriately applied.

When the estimated remaining amount of energy at the time of return is less than a predetermined remaining amount threshold, the control device 10 determines that the necessity level of maintenance of the shared vehicle Vn at the time of return is higher than the predetermined reference value, because the possibility of energy shortage is high during the subsequent travel.

The control device 10 according to one or more embodiments of the present invention transmits a start suppression command, such as for invalidating the operation input into the ignition, to the shared vehicle Vn for which the necessity level of maintenance is determined to be higher than the predetermined reference value. In addition, the control device 10 according to one or more embodiments of the present invention gives the user, via the user terminal device 400X, notice that the rental of the shared vehicle Vn is not permitted for the rental request 32 by the user. This can prevent the rental of a shared vehicle Vn of which the charging is insufficient and a shared vehicle Vn which needs maintenance to the user.

The control device 10 according to one or more embodiments of the present invention can determine whether or not to rent the shared vehicle Vn on the basis of the necessity level of maintenance using the state information of the shared vehicle Vn which is acquired by the vehicle state acquisition function (vehicle state acquisition step). This availability of rending may be determined for all of the shared vehicles Vn or for one or more shared vehicles Vn which are specified in the rental request.

Specifically, when the remaining amount of energy of the shared vehicle Vn is less than the predetermined remaining amount threshold, the control device 10 according to one or more embodiments of the present invention determines that the necessity level of maintenance of the shared vehicle Vn is high. In this operation, the control device 10 may temporarily prohibit the rental of the shared vehicle Vn. The remaining amount threshold, which is a basis to determine whether or not to rent the shared vehicle Vn, may preferably be determined from a viewpoint that the shared vehicle Vn does not become incapable of traveling during the use by the user. The remaining amount threshold can be determined with consideration for the largeness of an area to which the car sharing system service is applied, the interval of the stations PR, the cruising range of the shared vehicle Vn, etc. For example, when the shared vehicles Vn are electric cars, the remaining amount threshold may be, but is not limited to, 25% of the chargeable amount of battery.

In addition, the control device 10 according to one or more embodiments of the present invention determines that the necessity level of maintenance of the shared vehicle Vn is high when the condition information of the shared vehicle Vn is not within (is outside) a predetermined appropriate range which is predefined and within which maintenance is not needed (when the condition information of the shared vehicle Vn is represented by a value that is below or above the appropriate range). In this operation, the control device 10 may temporarily prohibit the rental of the shared vehicle Vn. The condition information may be the output information from a failure determination device of the onboard device 200Vn, the travel distance of the shared vehicle Vn, used hours of the battery, the number of times of charging the battery, the number of times of rapidly charging the battery, etc. When the control device 10 acquires an output value outside an appropriate range within which the failure determination device of the vehicle determines that the maintenance is not needed (when the control device 10 acquires an output value that is a value below or above the appropriate range), the control device 10 determines that the necessity level of maintenance of the shared vehicle Vn is high. In this operation, the control device 10 may temporarily prohibit the rental of the shared vehicle Vn. In such a case, it is required to temporarily stop the use of the shared vehicle Vn, transport the shared vehicle Vn to a maintenance facility MST, and appropriately restore the operation/function of the shared vehicle Vn. The output value outside the appropriate range may be a value that is larger than an appropriate threshold or a value that is smaller than an appropriate threshold. When the state information of the shared vehicle Vn is within the appropriate range, the travel of the shared vehicle Vn is maintained at a good state.

When the control device 10 acquires one or more output values of the travel distance of the vehicle, used hours of the battery, the number of times of charging the battery, and the number of times of rapidly charging the battery which are not within (are outside) the appropriate range in which maintenance is not needed, the control device 10 determines that the necessity level of maintenance of the shared vehicle Vn is high. In this operation, the control device 10 may temporarily prohibit the rental of the shared vehicle Vn. This is because it is required to temporarily stop the use of the shared vehicle Vn, transport the shared vehicle Vn to a maintenance facility MST, check whether or not the function of the shared vehicle Vn is appropriate, and restore the function.

The control device 10 may estimate the condition information at the time of returning the shared vehicle Vn on the basis of the condition information at the time of renting the shared vehicle Vn and determine the necessity level of maintenance using the estimated condition information at the time of return. This is because, if, after the shared vehicle Vn is rented to a user A at a station for rental PRL, the condition information is not within (is outside) the appropriate range when the shared vehicle Vn is returned to a station for return PRW, the shared vehicle Vn may not be suitable for rental to another user B.

The control device 10 estimates the condition information at the time of returning the shared vehicle Vn on the basis of the condition information at the time of renting the shared vehicle Vn. The condition information at the time of return is obtained by subtracting an estimated change amount of condition information from the condition information at the time of rental. The estimated change amount of condition information may be the total travel distance when the shared vehicle Vn arrives at the return point, used hours of the battery, the number of times of charging the battery, the number of times of rapidly charging the battery, etc. The control device 10 calculates the total travel distance at the time of return by adding the travel distance from the rental point to the return point to the total travel distance recorded at the rental point. The control device 10 calculates the used hours at the time of return by adding the travel time from the rental point to the return point to the used hours recorded at the rental point. The control device 10 calculates the number of times of charging/rapidly charging the battery at the time of return by adding the number of times of charging/rapidly charging the battery from the rental point to the return point to the number of times of charging/rapidly charging the battery recorded at the rental point.

Next, the recommended destination selection function (recommended destination selection step) executed by the control device 10 of the shared vehicle management device 100 according to one or more embodiments of the present invention will be described. When the recommended destination selection function (recommended destination selection step) is executed to determine that the necessity level of maintenance of the shared vehicle Vn is higher than a predetermined reference value, the control device 10 according to one or more embodiments of the present invention selects a recommended destination in accordance with the state information of the shared vehicle Vn. The control device 10 estimates a location to which the shared vehicle Vn required to be managed is then transported, and selects the location (facility for performing maintenance) as the recommended destination.

When the control device 10 according to one or more embodiments of the present invention determines that the remaining amount of energy of the shared vehicle Vn is less than a predetermined remaining amount threshold and the necessity of energy supply (one form of the maintenance) for the shared vehicle Vn is higher than a predetermined reference value, the control device 10 estimates that the shared vehicle Vn is transported to an energy supply facility CST for supply of energy. Then, the control device 10 according to one or more embodiments of the present invention selects the energy supply facility CST as the recommended destination for the shared vehicle Vn for which the necessity of energy supply is higher than the predetermined reference value. In accordance with the energy source of the shared vehicle Vn for which the necessity of energy supply is high, the control device 10 selects the energy supply facility CST which includes equipment capable of supplying the energy.

For example, when the shared vehicle Vn for which the necessity of energy supply is determined to be higher than the predetermined reference value is an electric car or hybrid car, the control device 10 selects the energy supply facility CST which includes charging equipment. The facility management information 312 includes information regarding the type of energy which can be supplied.

When a determination is made that the condition information of the shared vehicle Vn is not within (is outside) a predetermined appropriate range which is predefined and within which maintenance is not needed (when the condition information of the shared vehicle Vn is represented by a value that is below or above the appropriate range) and the necessity level of maintenance of the shared vehicle Vn is higher than the predetermined reference value, the control device 10 according to one or more embodiments of the present invention estimates that the shared vehicle Vn is transported to a maintenance facility MST for maintenance. Then, the control device 10 according to one or more embodiments of the present invention selects the maintenance facility MST, which includes equipment for restoring the condition so that the condition information falls within an appropriate range, as the recommended destination for the shared vehicle Vn which needs maintenance. The control device 10 selects the maintenance facility MST in accordance with the condition information of the shared vehicle Vn which is determined to need maintenance. For example, when the condition information represents the time for replacement of the battery, the control device 10 selects the maintenance facility MST which is stocked with batteries for replacement. When the condition information announces the time for periodical check, the control device 10 selects the maintenance facility MST which includes human resources and equipment for the periodical check. The facility management information 312 includes information regarding the contents of maintenance which each facility can respond to.

In one or more embodiments of the present invention, the point to be the recommended destination is a point other than a designated destination that is preliminarily defined as a return space for the shared vehicle Vn. The shared vehicle management device 100 according to one or more embodiments of the present invention defines a station PR at which the shared vehicle Vn can be allocated, as the return space. The user is usually not permitted to return the shared vehicle Vn to a space other than the stations PR at which rental and return of shared vehicles are performed. In a facility to be the recommended destination, the number of shared vehicles Vn that can be parked without interfering with the energy supply and the maintenance process and the like are limited, so that the stations PR and the facilities are difficult to be managed in an integrated manner with regard to the allocation control for the shared vehicles Vn. In one or more embodiments of the present invention, only when a predetermined condition is satisfied for the shared vehicle Vn which needs energy supply or the shared vehicle Vn which needs maintenance, it is permitted to return the shared vehicle Vn to the recommended destination (energy supply facility CST/ maintenance facility MST). This allows the user to transport the shared vehicle Vn to the facility without complicating the maintenance of the shared vehicle Vn.

The recommended destination presentation function (recommended destination presentation step) of the control device 10 according to one or more embodiments of the present invention will be described. The control device 10 presents the recommended destination selected by the recommended destination selection function (in the recommended destination selection step) to the user. The control device 10 presents the recommended destination via a display and/or a speaker of the user terminal device 400X. The recommended destination may be represented on a map, represented by a text that indicates the address, and/or represented by voice that reads aloud the address. The control device 10 presents the recommended destination to the user who desires to use the shared vehicle Vn.

When the state information (remaining amount of energy/ condition information) at the time of returning the shared vehicle Vn is estimated on the basis of the previously-described state information (remaining amount of energy/ condition information) at the time of rental, and the necessity level of maintenance of the shared vehicle Vn, which is obtained from the estimated state information (remaining amount of energy/condition information) at the time of return, is higher than the predetermined reference value, the control device 10 presents the recommended destination to be then directed from the return space (return station) to the user who desires to use the returned, shared vehicle Vn.

Transporting the shared vehicle Vn to the station PR or to the recommended destination (energy supply facility CST/ maintenance facility MST) is conventionally the work to be performed by an operator who engages in the operation of the car sharing system. In one or more embodiments of the present invention, when the user is made to transport the shared vehicle Vn, the operator is not made to transport the shared vehicle Vn. On the other hand, when the transportation process for the shared vehicle Vn has already been started by an operator, the process to present the recommended destination to the user is not performed.

When the transporting work management function (transporting work management step) to be described later is executed to determine that the operator has started to transport the shared vehicle Vn, the control device 10 according to one or more embodiments of the present invention does not perform the process to select a recommended destination in accordance with the state information of the shared vehicle Vn and present it to the user who desires to use the shared vehicle Vn. In other words, before the transporting work management function to be described later is executed to determine that the operator starts to transport the shared vehicle Vn, the control device 10 performs the process to select a recommended destination in accordance with the state information of the shared vehicle Vn and present it to the user who desires to use the shared vehicle Vn. This can prevent the occurrence of a situation in which the recommended destination is presented to the user to ask him/her to cooperate, but nevertheless, the vehicle is transported by an operator. Either the operator or the user is made to transport the shared vehicle Vn thereby to prevent preparation of redundant work for transportation of one shared vehicle Vn.

Furthermore, the control device 10 according to one or more embodiments of the present invention selects the recommended destination with consideration for the operation state of the energy supply facility CST and the maintenance facility MST. Specifically, the control device 10 refers to the facility management information 312 and selects the energy supply facility CST or the maintenance facility MST, which is available for the shared vehicle Vn, as the recommended destination. In the facility management information 312, as illustrated in FIG. 3B, the information to identify the energy supply facility CST and the maintenance facility MST is associated with the identification information to specify a plurality of workshops DC for charging/ maintenance of each shared vehicle Vn. Each workshop DC includes a charging device BT or a maintenance device MM (facility for maintenance). The identification information of each workshop DC is stored so as to be associated with a possible start time and an estimated finish time. At the possible start time, the charging/maintenance of the shared vehicle Vn can be started in the workshop DC. At the estimated finish time, the charging/maintenance of the shared vehicle Vn is to be finished in the workshop DC. From this information, whether or not each workshop DC is available can be known. The control device 10 refers to the possible start time and/or the estimated finish time of each workshop DC and selects the energy supply facility CST or the maintenance facility MST, which is available for the shared vehicle Vn, as the recommended destination. This operation can prevent the user from waiting at the facility until the workshop DC becomes unoccupied.

Specifically, the control device 10 of the shared vehicle management device 100 according to one or more embodiments of the present invention refers to the facility management information 312 of the management information 31 and selects the recommended destination having a facility when the available time for using the facility is before an estimated arrival time at which the shared vehicle Vn is estimated to arrive at the recommended destination or a time difference between the available time for using the facility and the estimated arrival time at which the shared vehicle Vn is estimated to arrive at the recommended destination is within a predetermined time period.

The control device 10 acquires the current position detected by the GPS receiver 210 from the onboard device 200Vn of each shared vehicle Vn and estimates a required time to the recommended destination using the average speed on the path from the current position to the recommended destination. Then, the control device 10 selects a facility of which the workshop DC (charging device BT/maintenance device MM) is available before the shared vehicle Vn arrives at the facility, as the recommended destination. This is because the user transporting the shared vehicle Vn should not be made to wait at the facility.

Even if the user is made to wait at the facility, the waiting time should be within a predetermined time period that is a short time. In such a case, therefore, only when the time difference between the available time for using the facility and the estimated arrival time at which the shared vehicle Vn is estimated to arrive at the recommended destination is within the predetermined time period, the facility is selected as the recommended destination. This operation can prevent the user from waiting at the facility for a long time.

When the control device 10 according to one or more embodiments of the present invention refers to the management information 31 including the operation state of the facility as the recommended destination and determines that the facility as the selected recommended destination is not available for a predetermined time period or more, the control device 10 selects a station PR within a predetermined distance from the recommended destination as another recommended destination. It is most preferred that a facility is available when the user arrives at the facility, but the facility may be busy in accordance with the date and time and the event being held. If an appropriate facility (recommended destination) is not present, it is a basic process to keep prohibiting the use of the shared vehicle Vn. In contrast, in such a case, the control device 10 according to one or more embodiments of the present invention selects a station PR within a predetermined distance from the recommended destination (facility) as a second recommended destination. When the user accepts the second recommended destination, the user can help to transport the shared vehicle Vn to the location (station PR) that is close to a facility to which the shared vehicle Vn should then be transported. This operation can reduce the transportation distance for the shared vehicle Vn by an operator and also reduce the cost for transportation.

An example will be described with reference to FIG. 2. It is now assumed that the station PRX is selected as the second recommended destination because the station ST (point A) is not available when the user desires to use the shared vehicle Vn from the station PR1. The destination of the user is a point B, and therefore the user accepts the selected second recommended destination and returns the shared vehicle Vn to the station PRX. In such a case, the user whose destination is the point B has no disadvantage in returning the shared vehicle Vn to the station PRX. Thus, the cost for an operator can be reduced because the travel distance when transporting the shared vehicle Vn from the station PRX to the station ST (point A) can be reduced than that when transporting the shared vehicle Vn from the station PR1 to the station ST (point A).

Finally, the transporting work management function (transporting work management step) executed by the control device 10 of the shared vehicle management device 100 according to one or more embodiments of the present invention will be described. Although not particularly limited, when the necessity level of maintenance of the shared vehicle Vn is higher than the predetermined reference value, a determination is made that the rental is temporarily prohibited, and the user does not accept the selected, recommended destination as the destination for the shared vehicle Vn, i.e., when the user cannot help to transport the shared vehicle Vn of which the rental is prohibited, the control device 10 according to one or more embodiments of the present invention initiates the work management function (executes the work management step). This operation can reduce the transportation cost for the shared vehicle Vn which is required for the management/operation of the car sharing system. As will be understood, an operator may be responsible for transportation of the shared vehicle Vn as a general rule, and the user may help to transport the shared vehicle Vn when an operator is absent.

The transporting work management function (transporting work management step) of the control device 10 is to manage work for transporting the shared vehicle Vn allocated to each station PR to a facility such as the energy supply facility CST and the maintenance facility MST. Similarly, the transporting work management function (transporting work management step) of the control device 10 is to manage work for transporting the shared vehicle Vn for which the maintenance is completed at a facility such as the energy supply facility CST and the maintenance facility MST to each station PR. The control device 10 is provided with the management information 31 including the operator management information 313 so that the control device 10 can refer to the management information 31. The operator management information 313 includes schedules for operators who engage in the operation of the car sharing system. With reference to the operator management information 313, the control device 10 can identify the operators and manage a work schedule for each operator which indicates when, from where, and to where, which shared vehicle Vn is transported. The control device 10 acquires the vehicle state of each shared vehicle Vn and determines the facility (energy supply facility CST/maintenance facility MST) to which the shared vehicle Vn should be transported and the time when the shared vehicle Vn should be transported.

Through this operation, an efficient transportation work can be performed on the basis of the schedule for the operator.

FIG. 3C illustrates an example of the operator management information 313. As illustrated in FIG. 3C, the operator management information 313 includes a vehicle transportation schedule, a work schedule, and personnel management information which are associated with the transportation of the shared vehicle Vn. The vehicle transportation schedule is defined so as to be associated with the work schedule relating to the transportation of the shared vehicle Vn for each operator ID which identifies the operator. The work schedule of transportation includes the carry-out start time/carry-in completion time for the shared vehicle Vn, the carry-out station PR for the shared vehicle Vn, the specific information of the shared vehicle Vn, and the carry-in station PR and parking area for the shared vehicle Vn. The work schedule is defined so as to be associated with the schedule of work to be performed for the shared vehicle Vn relating to the transportation for each operator ID which identifies the operator. Examples of the work may include energy supply work such as charging, maintenance work such as tire replacement, air pressure adjustment for tires, vehicle wash and vehicle interior cleaning, and check work such as a check of the vehicle control circuit, a program check for the onboard device and a lighting check.

The operator management information 313 includes the current position of the operator. This current position is represented by positional information detected by a GPS receiver of the operator terminal device 600X. According to this positional information, the current position and the history of locations of the operator can be known. The operator management information 313 includes progress information of the work by the operator. The progress information is information which each operator inputs as for his/her own work. The progress information represents the progress of the transportation process for the specified shared vehicle Vn and the progress of the maintenance process for the shared vehicle Vn. The operator management information 313 includes personnel management information. The personnel management information includes the working hours, break time and shift of each operator, and other items. The control device 10 refers to the position of the shared vehicle Vn and the work schedules, which include the current positions of the operators, to make an operator who is located near the shared vehicle Vn transport the shared vehicle Vn.

The control device 10 refers to the personnel management information and plans the vehicle transportation schedule and the work schedule so that each operator can perform the assigned transportation work and maintenance work within the prescribed working hours. The control device 10 refers to the progress information to adjust the vehicle transportation schedules and work schedules of the whole operators while evaluating whether or not each operator can accomplish the assigned transportation work and maintenance work within the prescribed working hours.

The control device 10 according to one or more embodiments of the present invention refers to the operator management information 313, which includes the schedule for the operator who transports the shared vehicle Vn, and determines at a predetermined period whether or not the operator has started to transport the shared vehicle Vn. The information whether or not the operator has started to transport the shared vehicle Vn is for determining the timing of executing the recommended destination selection function (recommended destination selection step) described above. Whether or not the operator has started to transport the shared vehicle Vn is determined on the basis of the progress information included in the operator management information 313. As described above, before a determination is made that the operator starts to transport the shared vehicle Vn, the control device 10 selects a recommended destination in accordance with the state information of the shared vehicle Vn and present it to the user. In other words, after a determination is made that the operator has started to transport the shared vehicle Vn, the control device 10 does not perform the process to select a recommended destination in accordance with the state information of the shared vehicle Vn. Through this operation, the transportation of the shared vehicle Vn can be efficiently performed without preparation of redundant work for one shared vehicle Vn.

The control device 10 according to one or more embodiments of the present invention refers to the operation rate of the shared vehicle Vn, which is included in the vehicle state management information 311 or station management information 314 of the management information 31, and makes the operator preferentially transport the shared vehicle Vn of a high operation rate to a given facility or station PR. Although not particularly limited, the control device 10 extracts a shared vehicle Vn of which the operation rate is not less than a predetermined value and preferentially assigns the operator to the extracted shared vehicle Vn to perform the transportation work. The operation rate of the shared vehicle Vn may be an operation rate that is associated with each station PR. This is because the operation rate of the shared vehicle Vn may increase not only in accordance with the performance and spec of the shared vehicle Vn but also in accordance with the convenience of the station PR to which the shared vehicle Vn is allocated.

With regard to the shared vehicle Vn of a high operation rate and the shared vehicle Vn which is allocated to the station PR of a high operation rate, if the appearance of a user who can undertake the transportation to the recommended destination is waited, the opportunity of a rental to another user (opportunity of getting a rental or lease fee) may possibly be lost. The control device 10 according to one or more embodiments of the present invention controls whether or not to perform the process to make the user transport the shared vehicle Vn, in accordance with the operation rate of the shared vehicle Vn. Through this operation, the control device 10 according to one or more embodiments of the present invention allows the shared vehicle Vn of a high operation rate to be immediately transported to an appropriate facility with greater importance to the efficiency while making the user transport the shared vehicle Vn of a low operation rate. This results in the cooperation by the user to transport the shared vehicle Vn without losing the opportunity of renting the shared vehicle Vn.

The control device 10 according to one or more embodiments of the present invention refers to the operator management information 313 including the schedule for the operator and selects the operator capable of the transportation work for the shared vehicle Vn, and transmits a command to make the operator transport the shared vehicle Vn to the recommended destination to the operator terminal device 600X carried by the operator. On the basis of the work command presented via the operator terminal device 600X, the operator transports the specified shared vehicle Vn from the specified station PR (facility) to the specified facility (station PR) at the specified time.

Here, the user terminal device 400X included in the shared vehicle management system 1000 according to one or more embodiments of the present invention will be described. The user terminal device 400X acquires programs for utilizing the car sharing system managed by the shared vehicle management device 100 via an electric communication line. The programs executed by the user terminal device 400X according to one or more embodiments of the present invention are downloaded to and stored in the user terminal device 400X. As will be understood, the programs according to one or more embodiments of the present invention may be those which are provided from an ASP (Application Service Provider) via an electric communication line and executed in the user terminal device 400X.

The programs according to one or more embodiments of the present invention use a computer included in the user terminal device 400X to cause the user terminal device 400X to execute a rental request reception function (rental request reception step), a recommended destination presentation function (recommended destination presentation step), and a limited rental permission function (limited rental permission step). Each of the user terminal devices 400X to 400Y according to one or more embodiments of the present invention includes an input device 410 that receives input information such as the rental request which requests the use of the shared vehicle Vn by each user. The input information is transmitted to the shared vehicle management device 100 via the communication device 420.

The rental request reception function according to one or more embodiments of the present invention is a function that causes the user terminal device 400X to execute a process to receive the rental request (rental request reception step). The user terminal device 400X receives the input of the rental request which requests the use of the shared vehicle Vn. Then, the user terminal device 400X transmits the received rental request to the external shared vehicle management device 100.

The recommended destination presentation function according to one or more embodiments of the present invention is a function that causes the user terminal device 400X to execute the recommended destination presentation function (recommended destination presentation step). The user terminal device 400X presents the recommended destination, which is acquired from the external device such as the shared vehicle management device 100, to the user. The recommended destination presented by the user terminal device 400X may be a recommended destination for the shared vehicle Vn of which the rental is requested by the user or a recommended destination for any shared vehicle Vn of shared vehicles Vn allocated to the stations PR at which the user requests the rental of a shared vehicle Vn. This is because, when the user rents the shared vehicle Vn, the user may transmit the rental request after specifying the vehicle or may also transmit the rental request for any vehicle which is located at a station PR.

With regard to the shared vehicle Vn which the user desires to rent, the control device 10 selects the recommended destination by using the state information of the shared vehicle Vn for which a determination is made that the necessity level of maintenance is higher than the predetermined value (the maintenance has to be performed) on the basis of the state information of the shared vehicle Vn. The selection process for the recommended destination performed by the external device such as the shared vehicle management device 100 is in common with the process as described in the above shared vehicle management device 100, and the description is borrowed herein.

The limited rental permission function according to one or more embodiments of the present invention is a function that causes the user terminal device 400X to execute a process of rental permission under a predetermined condition (limited rental permission step). When the user accepts the presented, recommended destination as the destination for the shared vehicle Vn, the user terminal device 400X according to one or more embodiments of the present invention determines that the rental of the shared vehicle Vn is possible. When a determination has been made that the rental is prohibited because the necessity level of maintenance of the shared vehicle Vn is higher than the predetermined reference value, the determination of prohibition of rental is canceled. Then, the user terminal device 400X according to one or more embodiments of the present invention permits the user to rent the shared vehicle Vn only for the use to the recommended destination.

Figure 4:
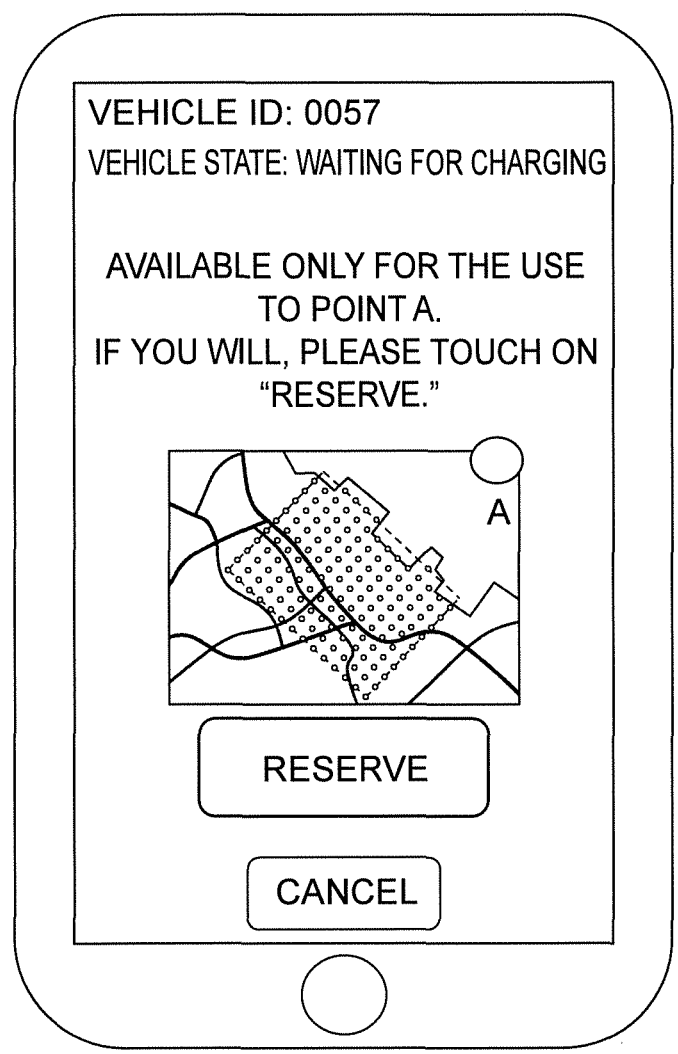
FIG. 4 is a view illustrating an example of a display image when requesting to accept a recommended destination as the destination according to one or more embodiments of the present invention.

FIG. 4 illustrates an example of display information on the user terminal device 400X according to one or more embodiments of the present invention. FIG. 4 illustrates information that is presented after the user inputs the rental request to specify the shared vehicle Vn (ID: 0057). The shared vehicle management device 100 prohibits the rental of the shared vehicle Vn (ID: 0057) on the basis of the fact, which is known by the acquired vehicle information, that the charge amount of the shared vehicle Vn (ID: 0057) is less than the predetermined value and the shared vehicle Vn (ID: 0057) is in a state of waiting to be transported to the energy supply facility CST. The shared vehicle management device 100 plans to transport the shared vehicle Vn (ID: 0057) to the energy supply facility CST at the point A in accordance with the state information (charge amount shortage) of the shared vehicle Vn (ID: 0057) of which the rental is prohibited. In this example, the point A (energy supply facility CST) is the recommended destination. The shared vehicle management device 100 transmits the recommended destination (point A) to the user terminal device 400X carried by the user who requests rental of the shared vehicle Vn (ID: 0057). The user terminal device 400X displays the acquired, recommended destination (point A) to the user, as illustrated in FIG. 4.

As illustrated in FIG. 4, the user terminal device 400X informs the user of the limiting condition as for the use of "Available only for the use to point A (recommended destination)." In addition, the user terminal device 400X requests acceptance under the limited availability. Specifically, the user terminal device 400X displays a text of "If you will, please touch on RESERVE." When the user touches on "RESERVE" (inputs an acceptance signal) in response to that request, the shared vehicle management device 100 and/or the user terminal device 400X (its operator) determine that the user accepts to rent the shared vehicle Vn (ID: 0057) under the limited condition of "available only for the use to point A (recommended destination)." In other words, a contract is concluded for the rental of the shared vehicle Vn under the limited condition for the return space. The user undertakes an obligation to transport the shared vehicle Vn to the point A (recommended destination).

According to the shared vehicle management device 100 of one or more embodiments of the present invention, even when the shared vehicle Vn which the user desires to use is not available for the reason of charging shortage, etc., the user can use the shared vehicle Vn by accepting the return to the recommended destination which is required in accordance with the vehicle state. Therefore, the availability of the car sharing system can be improved because the opportunities to use the shared vehicle Vn are increased under a given condition.

Figure 5:
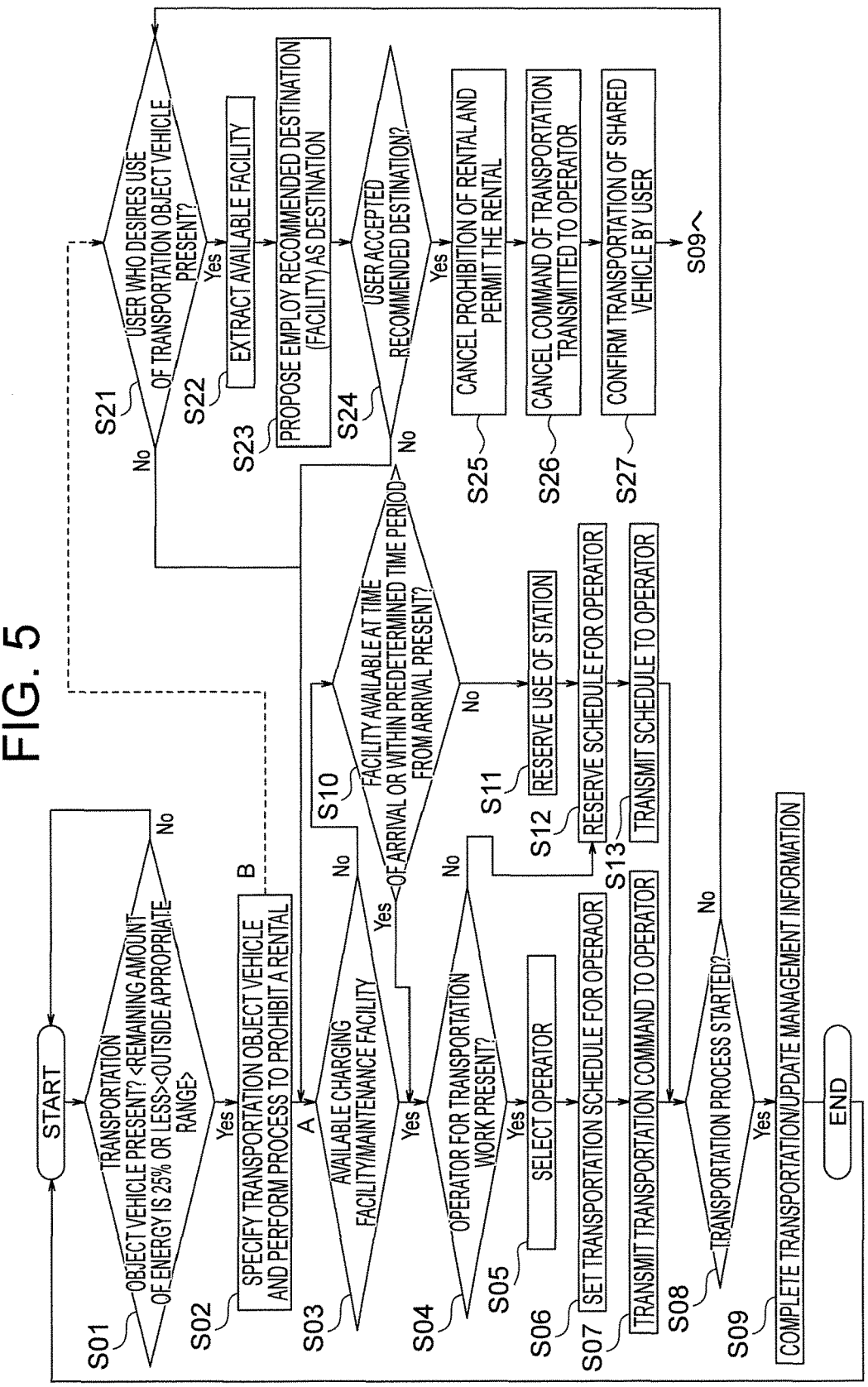
FIG. 5 is a flowchart illustrating the control procedure of a management process for a shared vehicle of the shared vehicle management device according to one or more embodiments of the present invention.

With reference to FIG. 5, the control procedure of a management process for the shared vehicle Vn in the shared vehicle management system 1000 according to one or more embodiments of the present invention will be described below.

FIG. 5 is a flowchart illustrating the control procedure of a use acceptance process for the shared vehicle Vn of the shared vehicle management device 100 according to one or more embodiments of the present invention.

In an initiation process, the control device 10 of the shared vehicle management device 100 according to one or more embodiments of the present invention acquires the rental request from the user. The user terminal device 400X executes the rental request reception function (rental request reception step) to receive the input of the rental request. The rental request includes a rental request to request the use of the shared vehicle Vn by the user. The rental request received by the user terminal device 400X is transmitted to the control device 10 of the shared vehicle management device 100.

In step S01, the control device 10 of the shared vehicle management device 100 refers to the vehicle state management information 311 of the management information 31 and extracts the shared vehicle Vn that is a transportation object to the facility (energy supply facility CST, maintenance facility MST). In an example of the extraction scheme, the control device 10 reads the remaining charge of battery included in the vehicle state management information 311 and extracts the shared vehicle Vn of which the remaining charge of battery is less than 25% of the chargeable amount. The threshold of the remaining charge of battery, which is the criterion for determination of the vehicle as the transportation object, may preferably be set with an added margin so that the shared vehicle Vn does not become impossible to travel due to the remaining charge of battery becoming zero during the use. The threshold of the remaining charge of battery for determining the vehicle as the transportation object is 25% in this example, but is not limited thereto. Similarly, the control device 10 reads the condition information included in the vehicle state management information 311 and extracts the shared vehicle Vn of which the condition information is not within (is outside) the appropriate range (the condition information is represented by a value that is below or above the appropriate range). As will be understood, the control device 10 may extract the shared vehicle Vn as the transportation object to the facility at a predetermined period or may also extract the shared vehicle Vn as the transportation object among the shared vehicles Vn which the user requests to rent.

In step S02, the control device 10 specifies the shared vehicle Vn which needs transportation to the facility for performing the maintenance process, and adds a flag indicating it to the vehicle state management information 311. The control device 10 determines that the maintenance has to be performed to the specified shared vehicle Vn, and adds a flag indicating the transportation to the maintenance facility to the vehicle state management information 311. The shared vehicle Vn to which the transportation flag to the maintenance facility (or the rental prohibition flag) is added may be subjected to a process to temporarily make the shared vehicle Vn unavailable, such as by the operation control for the ignition key.

In step S03, the control device 10 searches for a facility that can accept the shared vehicle Vn. The control device 10 according to one or more embodiments of the present invention extracts a facility that has an unoccupied workshop DC. The control device 10 refers to the facility management information 312 of the management information 31 and acquires information regarding the operation state of the facility. The control device 10 extracts a facility having a workshop DC that is currently available to use, on the basis of the facility management information 312 of the facility of which the distance from the station PR of the shared vehicle Vn as the transportation object is less than a predetermined value. When there is a facility having a workshop DC that is currently available, the process proceeds to step S04.

When there is not a facility having a workshop DC that is currently available, the process proceeds to step S10, in which the control device 10 extracts a facility of which the available time for using the workshop DC in the facility is before an estimated arrival time at which the shared vehicle Vn is estimated to arrive at the facility. The control device 10 extracts a facility of which the time difference between the available time for using the workshop DC in the facility and the estimated arrival time at which the shared vehicle Vn is estimated to arrive at the facility is within a predetermined time period.

In other words, the control device 10 extracts first a facility having a workshop DC that is currently available, extracts second a facility having a workshop DC that is available at the time of arrival of the shared vehicle Vn, and extracts third a facility having a workshop DC that is available within the predetermined time period from the time of arrival of the shared vehicle Vn. This operation allows extraction of a facility that is highly available and ensured that the user need not wait or waits for a while within the predetermined time of period. The location of this facility is the recommended destination. For example, when the energy supply facility CST does not have an unoccupied charging device BT, the control device 10 searches for a facility having a charging device BT that is available within a time period (e.g. 20 minutes) required for the transportation. When there is not a charging device BT that becomes unoccupied within a time period (e.g. 20 minutes) required for the transportation, the control device 10 searches for a facility having a charging device BT that becomes unoccupied within a time period (e.g. 30 minutes) to which a waiting time acceptable for the user is added. As will be understood, the time period required for the transportation can be appropriately set in accordance with the distance to the facility, the type of road of the path to the facility, the average speed on the path to the facility, the degree of traffic jam on the path to the facility, etc. The waiting time acceptable for the user can be appropriately set in accordance with the season, the air temperature, and the ambient environment.

In step S04, the control device 10 determines whether or not there is an operator who can perform the transportation work. In step S05, the control device 10 refers to the operator management information 313 of the management information 31 and selects an operator capable of the transportation work for the shared vehicle Vn. Although not particularly limited, the control device 10 refers to the progress information and current position of the operator management information 313 to preferentially select an operator located near the position of the shared vehicle Vn as the transportation object. In step S06, the control device 10 generates a schedule of the transportation work performed by the operator. Then, in step S07, the control device 10 transmits the command to transport the shared vehicle Vn to the operator terminal device 600X carried by the operator.

In step S08, the control device 10 refers to the operator management information 313, which includes the progress information input by the operator, and confirms the start of the transportation work. After the confirmation of the start of the transportation work, the control device 10 continuously refers to the operator management information 313 including the progress information and confirms the completion of recovering the shared vehicle Vn. After the confirmation of the completion of recovering the shared vehicle Vn, the control device 10 updates the management information 31. Specifically, the control device 10 records that the transported, shared vehicle Vn is recovered and being in the charging/maintenance process into the vehicle state management information 311, records that the charging device BT or maintenance equipment of the facility to which the shared vehicle Vn is transported is being utilized into the facility management information 312, and records the completion of transportation performed by the operator into the operator management information 313. The above is the process procedure when the determination result in the flowchart is "Yes," i.e. the process to make the operator transport the shared vehicle Vn.

When the determination result in step S10 is "No" and there is not a workshop DC that is currently available or will be available in the near future, the process proceeds to step S11. In step S11, the control device 10 selects a station that is located within the predetermined distance from the facility (recommended destination) and/or closest to the facility (recommended destination) and reserves the use of the station. The location of this station is the second recommended destination. Step S11 is followed by step S12 in which the control device 10 refers to the operator management information 313 to reserve the schedule for an operator in accordance with the reservation time of the station. In step S12, the control device 10 plans a schedule to make the operator transport the shared vehicle Vn from the station (second recommended destination) to the facility (energy supply facility CST/maintenance facility MST: first recommended destination). In step S13, the control device 10 transmits the schedule planned in step S12 to the operator terminal device 600X carried by the operator.

Next, the process of steps S21 to S27 to make the user transport the shared vehicle Vn will be described. The process of steps S21 to S27 is executed before a determination is made in the above step S08 that the operator starts to transport the shared vehicle Vn ("No" in step S08). In simple terms, before the operator starts the transportation work, the recommended destination is selected in accordance with the state information of the shared vehicle Vn and represented to the user who desires to use the shared vehicle Vn.

As will be understood, the process of steps S21 to S27 according to one or more embodiments of the present invention may be executed immediately after the object vehicle is specified in the above step S02. In other words, after step S02, the process may proceed to step S21 (direction of arrow B) rather than proceeding to step S03 (direction of arrow A).

In step S21, the control device 10 according to one or more embodiments of the present invention determines whether or not there is a user who desires to use a transportation object vehicle. The control device 10 detects a user who desires to use the shared vehicle Vn on the basis of the rental request acquired from the user terminal device 400X. If there is not a user who desires to use a transportation object vehicle, the process proceeds to step S03 for performing the ordinary process to perform the transportation by an operator.

In step S22, the control device 10 extracts an available facility (recommended destination). The scheme as described in steps S03 and S10 may be used herein as that for selecting an available facility (recommended destination). In addition, a second recommended destination may be selected using the previously described process of step S11.

In step S23, the control device 10 proposes to employ the recommended destination (energy supply facility CST/maintenance facility MST) as the destination to the user terminal device 400X carried by the user who desires the use. The control device 10 causes the user terminal device 400X to execute the recommended destination presentation function (recommended destination presentation step) to display the previously-described image as illustrated in FIG. 4, etc., and encourages the user to contemplate employing the recommended destination as the destination.

In step S24, the control device 10 determines whether or not the user accepts to employ the recommended destination (energy supply facility CST/maintenance facility MST) as the destination. If the user does not accept to employ the recommended destination as the destination, the process proceeds to step S03 for performing the ordinary process to perform the transportation by an operator. On the other hand, when the user accepts to employ the recommended destination as the destination, the process proceeds to step S25.

In step S25, the control device 10 cancels the prohibition of the rental of the transportation object vehicle and permits the user, who accepts to employ the recommended destination as the destination in step S24, to rent the transportation object vehicle. The control device 10 causes the user terminal device 400X to execute the limited rental permission function (limited rental permission step) and informs the user of the permission of rental. The control device 10 cancels the prohibition of driving the shared vehicle Vn. The user can use the shared vehicle Vn, which is short of the remaining charge of battery or needs maintenance, to the facility such as a charging station and maintenance station. In this operation, although not particularly limited, the control device 10 transmits the estimated cruising range or expected driving time calculated in accordance with the remaining charge of battery of the shared vehicle Vn to the user terminal device 400X, such as a smartphone, carried by the user. This data is also recorded in the vehicle state management information 311.

In step S26, the control device 10 cancels the transportation command which is announced to the operator.

Finally, in step S27, the control device 10 confirms that the user has transported the shared vehicle Vn as the transportation object to the specified, recommended destination. The control device 10 acquires the current position of the shared vehicle Vn when the ignition is turned off from the vehicle state management information 311 and compares the current position with the positional information of the recommended destination. When the control device 10 determines that the distance between the current position and the location of the recommended destination is less than a predetermined value and both the locations are the same, the control device 10 determines that the rented, shared vehicle Vn has been returned to the specified, recommended destination.

If the shared vehicle Vn does not arrive at the facility, such as a charging station, as the destination within the previously-calculated cruising range or expected driving time at the time of permission of rental, the control device 10 determines that some trouble occurs, confirms the location of the shared vehicle Vn, communicates with the user via the user terminal device 400X, and confirms the situation and the support to be performed. If, on the other hand, the user does not return the shared vehicle Vn to the recommended destination which the user accepts, the control device 10 encourages the user to execute the contract to return the shared vehicle Vn to the recommended destination. If the control device 10 cannot communicate with the user or the cooperation by the user is not expected, the control device 10 brings the vehicle to a stop and executes the process to make the operator recover the vehicle (steps S04 to S09, steps S12 to S13). In this manner, care is taken to an accident that occurs when a vehicle in a state of energy shortage or a vehicle which needs maintenance is rented, and it is therefore possible to avoid a situation in which the shared vehicle Vn comes to a standstill due to battery shortage and/or cannot be recovered.

Thus, the shared vehicle management device 100 according to one or more embodiments of the present invention sets a location to which the shared vehicle Vn is then transported as the recommended destination in accordance with the vehicle state of the shared vehicle Vn and exceptionally permits the user, who accepts to employ the recommended destination as his/her destination, to use the shared vehicle Vn. According to one or more embodiments of the present invention, it is possible to increase the opportunities of using the shared vehicle Vn which should be prohibited from being used if on the basis of the vehicle state such as the remaining charge of battery, and reduce the cost for an operator who transports the shared vehicle Vn to the facility such as a charging station.

A shared vehicle management device 100 according to one or more embodiments of the present invention may achieve one or more of, the following effects.

(1) When a determination is made that the necessity level of maintenance of the shared vehicle Vn is higher than a predetermined reference value on the basis of the state information of the shared vehicle Vn, the shared vehicle management device 100 according to one or more embodiments of the present invention presents a facility that includes necessary equipment for maintenance of the shared vehicle Vn as a recommended destination and can therefore encourage the user to cooperate for the transportation of the shared vehicle Vn. This operation results in a reduced operation cost for transporting the shared vehicle Vn, and the management and operation cost of the car sharing system can thus be reduced.

(2) When the user accepts the presented, recommended destination as the destination for the shared vehicle Vn, the shared vehicle management device 100 according to one or more embodiments of the present invention permits the user to rent the shared vehicle Vn. The user can therefore use the shared vehicle Vn which may not be rented in a conventional vehicle management device. As a result, the availability of the car sharing system can be improved. From a different point of view, it is possible to reduce the cost for an operator who transports the shared vehicle Vn to a given, recommended destination because the user can be made to transport the shared vehicle Vn to the recommended destination when the user accepts this operation. As a result, the cost for management and operation of a one-way type car sharing system can be reduced.

(3) The shared vehicle management device 100 according to one or more embodiments of the present invention determines the necessity level of maintenance on the basis of the remaining amount of energy of the shared vehicle Vn and presents an energy supply facility CST (recommended destination) including energy supply equipment to the user. The user can therefore cooperate for transporting the shared vehicle Vn which is short of the remaining amount of energy to the energy supply facility CST. This may allow the above-described action and effect.

(4) The shared vehicle management device 100 according to one or more embodiments of the present invention determines the necessity level of maintenance on the basis of the condition of the shared vehicle Vn and presents a maintenance facility MST (recommended destination) including maintenance equipment that restores the condition so that the condition information falls within an appropriate range to the user. The user can therefore cooperate for transporting the shared vehicle Vn which needs maintenance to the maintenance facility MST. This may allow the above-described action and effect.

(5) The shared vehicle management device 100 according to one or more embodiments of the present invention estimates the remaining amount of energy at the time of returning the shared vehicle Vn on the basis of the remaining amount of energy at the time of renting the shared vehicle Vn. When the estimated remaining amount of energy at the time of return is less than a predetermined remaining amount threshold, the shared vehicle management device 100 determines that the necessity level of maintenance of the shared vehicle Vn at the time of return is higher than the predetermined reference value. Then, the shared vehicle management device 100 presents energy supply facility(s) CST (recommended destination) including energy supply equipment for supplying energy to the shared vehicle Vn to the user. The user can therefore cooperate for transporting the shared vehicle Vn which may possibly be short of the remaining amount of energy to the energy supply facility CST. This may allow the above-described action and effect.

(6) The shared vehicle management device 100 according to one or more embodiments of the present invention estimates the condition information at the time of returning the shared vehicle Vn on the basis of the condition information at the time of renting the shared vehicle Vn. When the estimated condition information at the time of return is not within (is outside) a predetermined appropriate range, the shared vehicle management device 100 determines that the necessity level of maintenance of the shared vehicle Vn at the time of return is higher than the predetermined reference value. Then, the shared vehicle management device 100 presents a maintenance facility MST (recommended destination) including maintenance equipment for restoring the condition so that the condition information falls within the appropriate range to the user. The user can therefore cooperate for transporting the shared vehicle Vn which needs maintenance to the maintenance facility MST. This may allow the above-described action and effect.

(7) The recommended destination according to one or more embodiments of the present invention is a point other than a designated destination that is preliminarily defined as a return space for the shared vehicle Vn. When the shared vehicle Vn is returned to an energy supply facility CST or maintenance facility MST at which a given work is performed, a special management is required so as not to interfere with the work. In the car sharing system according to one or more embodiments of the present invention, designated stations PR and other designated destinations of which the use is preliminarily permitted and a recommended destination of which the use is permitted only when a predetermined condition is satisfied are distinguished so that the user cannot freely return the shared vehicle Vn to the recommended destination. This operation allows the user to transport the shared vehicle Vn to the facility without complicating the management of the shared vehicle Vn.

(8) The shared vehicle management device 100 according to one or more embodiments of the present invention refers to the management information 31, which includes the operation state of facilities of the recommended destination, and selects the location of an available facility as the recommended destination. This operation can prevent the user from waiting at the facility until the workshop DC such as a workshop DC for energy supply and workshop DC for maintenance becomes unoccupied.

(9) The shared vehicle management device 100 according to one or more embodiments of the present invention refers to the management information 31 and selects the location of a facility that is available when the shared vehicle Vn arrives at the recommended destination, as the recommended destination. Therefore, the user who has transported the shared vehicle Vn to the recommended destination need not wait. The shared vehicle management device 100 selects a facility that is available within a predetermined time period from when the shared vehicle Vn arrives at the recommended destination. Therefore, even if the user who has transported the shared vehicle Vn to the recommended destination is made to wait, the waiting time can be within the predetermined time period. This operation can improve the availability for the user when transporting the shared vehicle Vn to the recommended destination.

(10) When the user does not accept the recommended destination as the destination, the shared vehicle management device 100 according to one or more embodiments of the present invention refers to the management information 31 including the schedules for operators and transmits a command to transport the shared vehicle Vn to the operator terminal device 600X carried by an operator who is capable of the transportation work for the shared vehicle Vn. Therefore, the shared vehicle Vn which needs treatment such as charging and maintenance can be transported to the facility without being left.

(11) The shared vehicle management device 100 according to one or more embodiments of the present invention presents the recommended destination to the user before the operator starts to transport the shared vehicle Vn. This operation can prevent the occurrence of a situation in which the recommended destination is presented to the user and accepted by the user, but nevertheless, the vehicle is transported by an operator. Thus, the transportation by the user or the transportation by the operator can be exclusively performed.

(12) The shared vehicle management device 100 according to one or more embodiments of the present invention refers to the management information 31 including the operation rate of the shared vehicle Vn allocated to each station and transmits a command to preferentially transport the shared vehicle Vn of a high operation rate to the operator terminal device 600X. It is preferred that the shared vehicle Vn of a high operation rate or the shared vehicle Vn allocated to a station PR of a high operation rate is transported to the facility as soon as possible and allocated to the station PR as soon as possible. In one or more embodiments of the present invention, the shared vehicle Vn of a high operation rate is preferentially transported by an operator without waiting the appearance of a user who can undertake the transportation to the recommended destination, and therefore the opportunity of a rental to another user (opportunity of getting a rental or lease fee) may not be lost. Through this operation, the shared vehicle Vn of a high operation rate can be immediately transported to an appropriate facility with greater importance to the efficiency, while the shared vehicle Vn of a low operation rate can be transported by the user. This results in an appropriate combination of the prompt transportation by the operator and the transportation at low cost by the user.

(13) When the shared vehicle management device 100 according to one or more embodiments of the present invention refers to the management information 31 including the operation state of the facility as the recommended destination and determines that the facility as the selected recommended destination is not available for a predetermined time period or more, the control device 10 selects a station within a predetermined distance from the recommended destination as a second recommended destination. It is preferred that the shared vehicle Vn which needs transportation is transported to an object facility (recommended destination), but the facility may not be available because the facility is busy. If an appropriate facility (recommended destination) is not present, it is a basic process to transport the shared vehicle Vn by an operator. In such a case, according to one or more embodiments of the present invention, a station PR within a predetermined distance from the recommended destination (facility) is selected as the second recommended destination. Therefore, when the user accepts the second recommended destination, the user can help to transport the shared vehicle Vn to the station PR that is close to a facility to which the shared vehicle Vn should then be transported. This operation can reduce the transportation distance for the shared vehicle Vn and also reduce the cost for transportation of the shared vehicle Vn.

(14) A method that executes steps defined by a program according to one or more embodiments of the present invention may achieve one or more of the above actions and/or effects. According to the shared vehicle management device 100 of one or more embodiments of the present invention, even if the shared vehicle Vn which the user desires to use is not available for the reason of charging shortage, etc., the user can get an opportunity to use the shared vehicle Vn when the transportation can be moved to the recommended destination in accordance with the state information of the shared vehicle Vn. Therefore, the availability of the car sharing system can be improved because the opportunities to use the shared vehicle Vn are increased under a given condition.

Embodiments heretofore explained are described to facilitate understanding of the present invention and are not described to limit the present invention. Therefore, it is intended that the elements disclosed in the above embodiments include all design changes and equivalents to fall within the technical scope of the present invention.

Above, the shared vehicle management device 100 is exemplified as a form of the shared vehicle management device according to the present invention, but the present invention is not limited to this.

In the present description, the shared vehicle management device 100 comprising the control device 10 (computer) that has a CPU 11, a ROM 12, and a RAM 13 is exemplified as a form of the shared vehicle management device, but the present invention is not limited to this.

In the present description, the shared vehicle management device 100 comprising the control device 10 that executes the vehicle state acquisition function, the rental determination function, the recommended destination selection function, and the recommended destination presentation function is exemplified as a form of the shared vehicle management device that has the rental request acquisition unit, the vehicle state acquisition unit, the rental determination unit, and the recommended destination selection unit, but the present invention is not limited to this.

In the present description, the shared vehicle management device 100 comprising the control device 10 that executes the vehicle state acquisition function, the rental determination function, the recommended destination selection function, and the recommended destination presentation function is exemplified as a form of the shared vehicle management device that executes the rental request acquisition step, the vehicle state acquisition step, the rental determination step, and the recommended destination selection step, but the present invention is not limited to this.

In the present description, the shared vehicle management device 100 comprising the control device 10 that further executes the transporting work management function is exemplified as a form of the shared vehicle management device that further comprises the transporting work management unit, but the present invention is not limited to this.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

DESCRIPTION OF REFERENCE NUMERALS

1000 Shared vehicle management system
100 Shared vehicle management device
10 Control device
11 CPU
12 ROM
13 RAM
20, 220, 420, 520 Communication device
30 Database
31 Management information
311 Vehicle state management information
312 Facility management information
313 Operator management information
314 Station (Port) management information
32 Rental request
V1 to Vn Shared vehicle
200, 200V1 to 200Vn On-board device
400, 400X to 400Y User terminal device
500, 500X to 500Y Facility terminal device
600, 600X to 600Y Operator terminal device
PR Station (Port)

The invention claimed is:

1. A shared vehicle management device that communicates with a user terminal device and an operator terminal device in an electronic shared vehicle management system for managing shared vehicles used by users, comprising:
   a communication device that receives an electronic rental request from the user terminal device, the request made by a user of the users; and
   a processor, wherein the processor processes a rental request acquisition based on the electronic rental request,
   wherein the communication device further acquires state information of a shared vehicle of the shared vehicles, wherein the state information comprises Global Positioning System (GPS) data acquired from a GPS receiver in the shared vehicle,
   wherein the processor further processes a rental determination that:
   determines a necessity level of maintenance of the shared vehicle on a basis of the state information of the shared vehicle, and
   determines whether to prohibit or permit a rental of the shared vehicle with the state information of the shared vehicle and the electronic rental request by the user;
   wherein the processor further processes a recommended destination selection that:
   determines that the shared vehicle needs maintenance upon a determination that the necessity level of maintenance of the shared vehicle is higher than a predetermined reference value when the rental determination determines whether to prohibit or permit the rental of the shared vehicle;
   acquires a management information comprising a location of a maintenance facility and an availability of the maintenance facility; and
   uses the communication device to transmit a recommended destination presentation to the user terminal device that presents a recommended destination selected by the recommended destination selection to the user,
   wherein the recommended destination is selected based on the GPS data, the management information, and a predetermined wait time period,
   wherein the rental determination permits the rental of the shared vehicle when the user accepts the presented recommended destination as a destination for the shared vehicle, and
   wherein the processor further processes a transporting work management that, when the user does not accept the selected recommended destination as a destination for the shared vehicle:
   refers to the management information that further includes a schedule for an operator who transports the shared vehicle;
   selects the operator to perform transportation work for the shared vehicle; and
   transmits, using the communication device, a command to transport the shared vehicle to an operator terminal device carried by the operator, resulting in the shared vehicle being transported.

2. The shared vehicle management device according to claim 1,
   wherein the state information includes a remaining amount of energy that is used to drive the shared vehicle;
   wherein the rental determination determines that the necessity level of maintenance of the shared vehicle is higher than the predetermined reference value when the remaining amount of energy of the shared vehicle is less than a predetermined remaining amount threshold; and
   wherein the recommended destination selection selects an energy supply facility for supplying energy to the shared vehicle as the recommended destination when a determination is made that the necessity level of maintenance of the shared vehicle is higher than the predetermined reference value.

3. The shared vehicle management device according to claim 1,
   wherein the state information includes condition information of the shared vehicle;
   wherein the rental determination determines that the necessity level of maintenance of the shared vehicle is higher than the predetermined reference value when the condition information of the shared vehicle is not within a predefined appropriate range; and
   wherein the recommended destination selection selects a maintenance facility for restoring the condition of the shared vehicle so that the condition information falls within the appropriate range as the recommended destination when a determination is made that the necessity level of maintenance of the shared vehicle is higher than the predetermined reference value.

4. The shared vehicle management device according to claim 1,
wherein the state information includes a first remaining amount of energy, at a time of renting the shared vehicle, that is used to drive the shared vehicle;
wherein the rental determination estimates a second remaining amount of energy, at a time of returning the shared vehicle, on a basis of the first remaining amount of energy and determines that the necessity level of maintenance of the shared vehicle at the time of returning is higher than the predetermined reference value when the estimated second remaining amount of energy at the time of returning is less than a predetermined remaining amount threshold; and
wherein the recommended destination selection selects an energy supply facility for supplying energy to the shared vehicle as the recommended destination when a determination is made that the necessity level of maintenance of the shared vehicle at the time of returning is higher than the predetermined reference value.

5. The shared vehicle management device according to claim 1,
wherein the state information includes condition information of the shared vehicle;
wherein the rental determination estimates the condition information at a time of returning the shared vehicle on a basis of the condition information at a time of renting the shared vehicle and determines that the necessity level of maintenance of the shared vehicle at the time of returning is higher than the predetermined reference value when the estimated condition information at the time of returning is not within a predefined appropriate range; and
wherein the recommended destination selection selects a maintenance facility for restoring the condition of the shared vehicle so that the condition information falls within the appropriate range as the recommended destination when a determination is made that the necessity level of maintenance of the shared vehicle at the time of returning is higher than the predetermined reference value.

6. The shared vehicle management device according to claim 1,
wherein the recommended destination is a point other than a point that is predetermined as a return space for the shared vehicle and is able to be designated as a destination for the shared vehicle.

7. The shared vehicle management device according to claim 1,
wherein the recommended destination selection refers to management information and selects a location of a facility that is available as the recommended destination, the management information including an operation state of the facility that is the recommended destination.

8. The shared vehicle management device according to claim 7,
wherein the recommended destination selection further:
refers to the management information; and
selects the location of the maintenance facility as the recommended destination when an available time for using the maintenance facility is before an estimated arrival time at which the shared vehicle is estimated to arrive at the recommended destination or a time difference between an available time for using the maintenance facility and the estimated arrival time at which the shared vehicle is estimated to arrive at the recommended destination is within a predetermined time period.

9. The shared vehicle management device according to claim 1,
wherein the transporting work management refers to the management information and determines whether or not the operator starts to transport the shared vehicle;
wherein the recommended destination selection selects the recommended destination in accordance with the state information of the shared vehicle before the transporting work management determines that the operator starts to transport the shared vehicle; and
wherein the recommended destination presentation presents the recommended destination to the user who desires to use the shared vehicle.

10. The shared vehicle management device according to claim 1,
wherein the management information includes an operation rate of the shared vehicle allocated to each station, and
wherein the transporting work management further:
refers to the management information; and
transmits a command, using the communication device, to make the operator preferentially transport the shared vehicle of which an operation rate is high, to the operator terminal device carried by the operator.

11. The shared vehicle management device according to claim 1,
wherein the management information includes an operation state of a facility as the recommended destination, and
wherein, when the recommended destination selection refers to the management information and determines that the facility as the selected, recommended destination is not available for a predetermined time period or more:
the recommended destination selection selects a station within a predetermined distance from the recommended destination as a second recommended destination.

12. A non-transitory computer-readable storage medium storing instructions executable by a computer to perform a method of electronically managing shared vehicles, comprising:
acquiring, using a communication device, an electronic rental request by a user using a user terminal device;
acquiring, using the communication device, state information from a shared vehicle;
determining a necessity level of maintenance of the shared vehicle on a basis of the state information of the shared vehicle, wherein the state information comprises Global Positioning System (GPS) data acquired from a GPS receiver in the shared vehicle;
determining whether to prohibit or permit a rental of the shared vehicle on the basis of the state information of the shared vehicle and the electronic rental request by the user;
selecting a facility comprising necessary equipment for maintenance of the shared vehicle as a recommended destination when based on a determination that the necessity level of maintenance of the shared vehicle is higher than a predetermined reference value;

acquiring a management information comprising a location of a maintenance facility and an availability of the maintenance facility;

presenting, using the communication device and transmitting to the user terminal device, the recommended destination to the user, wherein the recommended destination is selected based on the GPS data, the management information, and a predetermined wait time period;

based on a determination that the user accepts the presented, recommended destination as a destination for the shared vehicle: determining to permit the rental of the shared vehicle; and based on a determination that the user does not accept the presented, recommended destination for the shared vehicle:

determining to prohibit the rental of the shared vehicle;

referring to the management information that includes a schedule for an operator who transports the shared vehicle;

selecting the operator for transporting the shared vehicle; and transmitting, using the communication device, a command to transport the shared vehicle to a terminal device carried by the operator, resulting in the shared vehicle being transported.

* * * * *